March 6, 1951      F. HINRICHS      2,544,161
COMPRESSION VALVE
Filed April 19, 1946      2 Sheets-Sheet 1
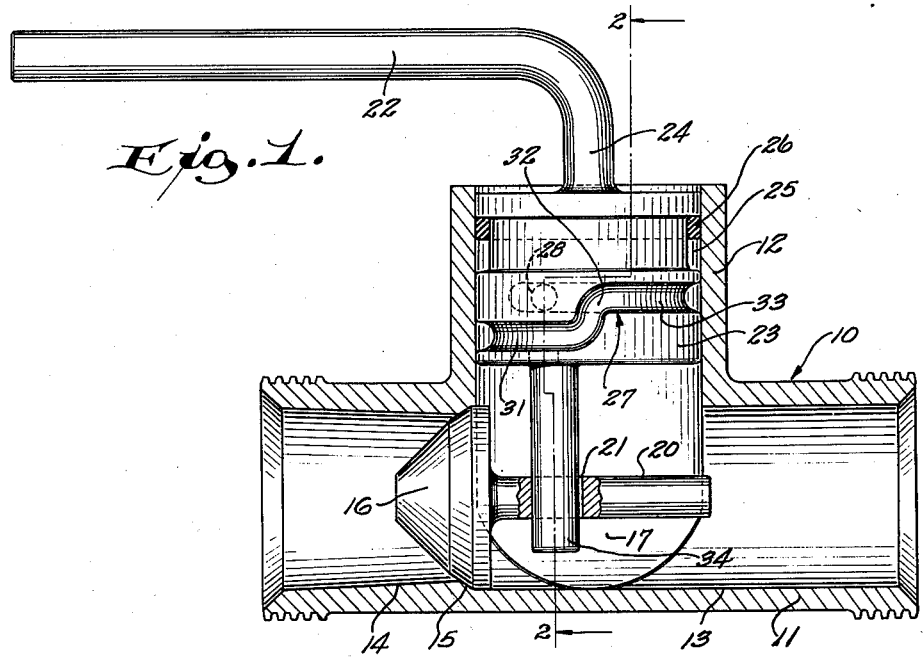
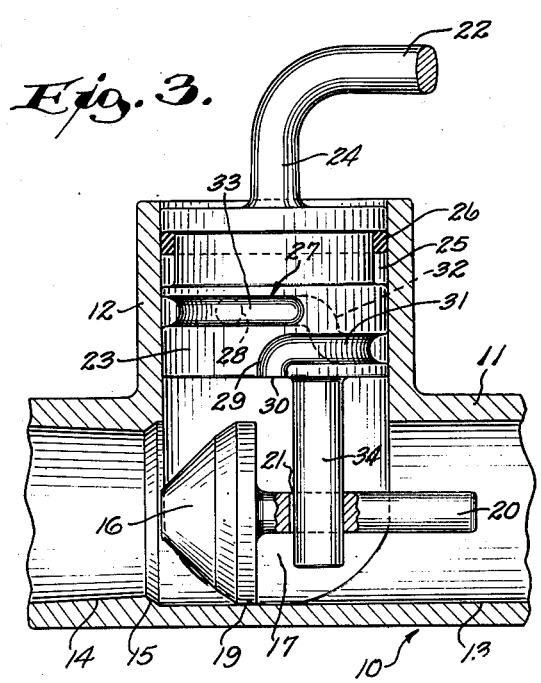
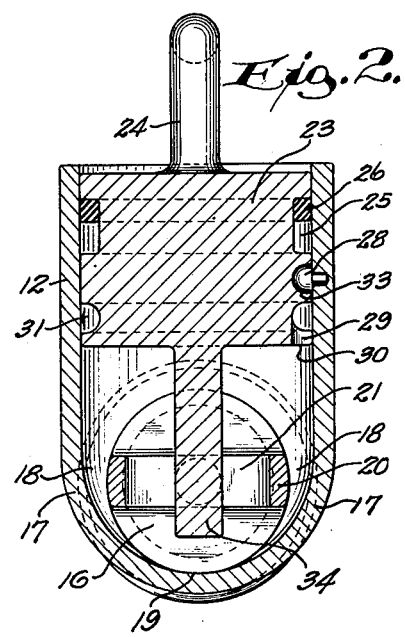
INVENTOR.
Ferdinand Hinrichs
BY
Morsell & Morsell
ATTORNEYS.

March 6, 1951 F. HINRICHS 2,544,161
COMPRESSION VALVE
Filed April 19, 1946 2 Sheets-Sheet 2

INVENTOR.
Ferdinand Hinrichs
BY
Morsell & Morsell
ATTORNEYS.

Patented Mar. 6, 1951

2,544,161

UNITED STATES PATENT OFFICE 2,544,161

COMPRESSION VALVE

Ferdinand Hinrichs, Kenosha, Wis., assignor to Tri-Clover Machine Co., Kenosha, Wis., a corporation of Wisconsin Application April 19, 1946, Serial No. 663,266

9 Claims. (Cl. 251—39)

This invention relates to improvements in compression valves.

The valve with which the present invention is concerned is particularly adapted for use in connection with milk pasteurizing equipment and for use in other places where a high degree of sanitation is required. Valves used in pasteurizing equipment must be removed and taken apart daily for cleaning. For this reason it is important that the parts have a minimum of food catching projections and that they be readily separable so that removal and cleaning can be quickly effected and reassembly accomplished without loss of valuable time.

In a straightway compression type of valve with which the present invention is particularly concerned, the valve member is movable axially of the fluid conducting conduit, and there are usually two axially alined bore portions of different diameter in order to make it possible to form a valve seat. Where the valve seat is thus formed it has been common practice to provide a relatively large difference in the diameter between the two bore portions so that the valve opening will be substantially lessened. Thus, a valve member of sufficiently small diameter may be used to provide for free flow of material between the periphery of the valve member and the wall of the conduit when the valve is open. Where such a small valve member is employed, however, there must be guiding wings or fins to keep the valve member centered and to support it for sliding movement. Furthermore, where the valve opening is relatively small and where there is a relatively large difference in diameter between the two bore portions, there is necessarily a relatively large annular shoulder behind which milk solids can collect to contaminate the equipment. Such a valve, therefore, as commonly constructed, is objectionable for use in the food industry or for other uses where sanitation is a factor.

It is a general object of the present invention to provide a valve of the class described which provides two alined bore portions with a very small difference in diameter, just sufficient to form a valve seat without having a large shoulder to trap milk or other fluid, which nevertheless provides for the free flow of milk or similar liquid past the periphery of the valve member, when the latter is open, with a minimum of obstruction to the flow.

A more specific object of the invention is to accomplish the above purpose in the combination by having the tubular valve body extension, which accommodates the valve operating assembly, of substantially larger diameter than the conduit with which it connects whereby there will be relatively large bulges on each side of the conduit furnishing spaces between said bulges and the periphery of the valve member to permit liquids to readily pass through said spaces when the valve member is open. Heretofore it has been necessary to have the diameter of the valve disk relatively small to provide sufficient space around the periphery thereof.

A further object of the invention is to provide in a sanitary valve of the class described, relatively simple means for eliminating the nut normally employed on the end of the body extension, said means serving to releasably maintain the valve operating assembly and handle in assembled position while providing for the quick separation or assembly of parts for cleaning or repair.

A more specific object of the invention is to provide a construction as above described wherein there is a cylindrical collar at the inner end of the handle which is rotatable within a tubular extension of the valve body and which carries a crank pin for operating the valve, the collar and tubular extension having cooperating pin and slot means which permits rotating movement of the collar for valve operating purposes but which prevents accidental removal of the operating assembly.

Other objects of the invention are to provide a valve which is relatively simple in construction, which has a minimum number of parts, which is positive in operation, and which is otherwise well adapted for the purpose described.

With the above and other objects in view, the invention consists of the improved compression valve, and all its parts and combinations, as set forth in the claims, and all equivalents thereof.

In the accompanying drawings, illustrating several embodiments of the invention, in which the same reference numerals designate the same parts in all of the views:

Fig. 1 is a longitudinal sectional view through the valve body illustrating the operating parts therein with the valve member in closed position;

Fig. 2 is a sectional view taken on line 2—2 of Fig. 1;

Fig. 3 is a view similar to Fig. 1 illustrating the valve in open position, parts of the valve body being broken away;

Figure 4:
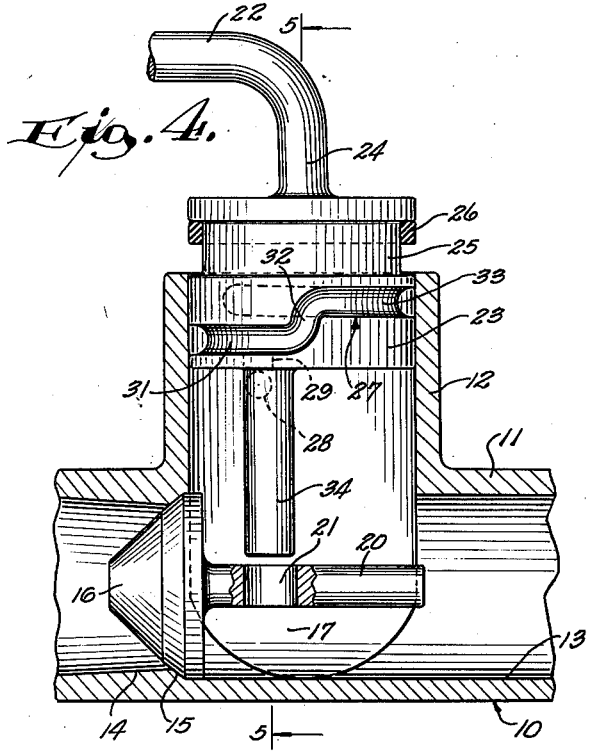
Fig. 4 is a view similar to Fig. 3, showing the operating assembly as it is being inserted or as it is being removed.
Figure 5:
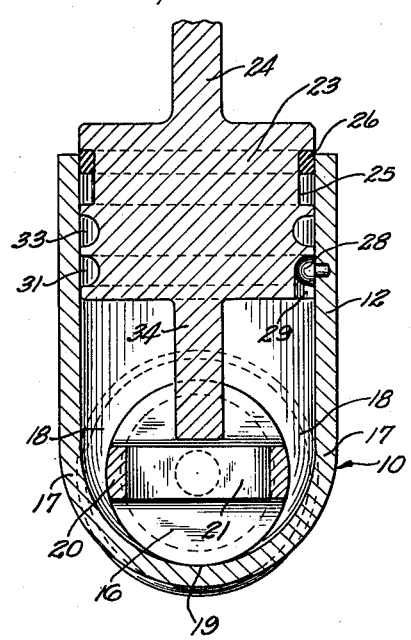
Fig. 5 is a sectional view taken approximately on the line 5—5 of Fig. 4, but showing the pin engaged in the entrance groove portion.

Referring more particularly to Figs. 1 to 5 inclusive of the drawing, the numeral 10 designates the valve body which is formed of suitable metal, usually of stainless steel, when the valve is employed in pasteurizing equipment. The valve body includes a main conduit portion 11 and a tubular extension 12 which joins the conduit portion 11 at approximately right angles thereto. The internal bore portion 13 of the conduit 11 has a normal diameter. The internal bore portion 14, however, is of tapered formation to reduce the diameter so that it is somewhat less than the diameter at 13 to thus form material which may be used for the valve seat 15. The difference in diameters on the two sides of the seat 15 is just enough to form a suitable seat.

Heretofore, it has been common practice to have a relatively large reduction in diameter on the left hand side of the seat 15. This formed a relatively large shoulder, and the valve opening was of restricted size and adapted to be closed by a valve member substantially smaller than the valve member 16, with a diameter substantially less than the diameter of the bore portion 13. Thus, in prior devices, by cutting down on the diameter of the valve member, there was room for fluid to pass around the periphery of the valve while flowing through the conduit portion 10 with the valve open. However, in sanitary equipment this type of valve was very objectionable, as the large shoulder formed behind the valve seat permitted milk solids to collect and contaminate the equipment. Furthermore, guiding fins had to be used on the valve member to keep the latter properly centered.

With the present structure, the valve seat 15 is formed without the use of any large or prominent shoulder or without any great change in diameter. As a result, the valve member 16 may be of sufficient diameter to have a snug sliding fit with the bore portion 13. With prior constructions such a snug fit of the valve in the bore portion 13 would hinder the passage of fluid around the periphery of the valve and into the bore portion 13. As a matter of fact, fluid would only be able to pass over the uppermost part of the valve member where space is provided by the juncture of the tubular extension 12 with the main conduit portion 10.

With the present construction, the valve member may be made substantially the diameter of the bore portion 13 without preventing free flow of liquid through the conduit 10 and without interfering with free drainage. This is accomplished by having the tubular extension 12 of substantially larger diameter than the conduit portion 10 instead of having it of the same diameter as has heretofore been common practice. By having it of substantially larger diameter there are bulges 17 (see Fig. 2) formed on each side of the valve member when the latter is in open position, to provide spaces 18 on each side of the periphery of the valve member through which liquid may freely flow in addition to being able to flow over the top of the valve member. By providing a construction which permits making the valve member of full diameter without interfering with the flow, the lower portion of the valve member will engage the bore portion 13 as at 19 to form a guide and support for sliding movement of the valve during operation. In those prior structures where relatively small valve members have been employed, so as to provide for free flow therearound, it has been necessary to utilize wings or fins to guide the valve disc.

Projecting rearwardly from the valve member 16 is a short bar 20 having a transverse slot 21. The bar forms a valve stem.

In the form of the invention illustrated in Figs. 1 to 5 inclusive, the valve operating assembly includes a handle 22 having a cylindrical collar 23 integral with the handle portion 24 and concentric therewith. The external diameter of the cylindrical collar 23 is slightly less than the internal diameter of the valve body extension 12 so that the collar is rotatable therein. The collar may be formed with a peripheral recess 25 for accommodating a suitable packing ring 26. The recess is of substantial width so that rings 26 of selected width may be employed. For example, if an easy turning valve is desired, a narrow gasket will be used.

In addition to the recess 25, there is a collar locking groove 27 which is cooperable with a pin 28 projecting from the wall of the extension 12. The groove 27 includes a short axially extending entrance portion 29 which is open as at 30. Thus, the pin may be made to enter the portion 29 when the operating assembly is being inserted in the extension 12 while the parts are in the position of Fig. 4. Following this procedure, then, by rotating the handle in a clockwise direction, referring to Fig. 3, the pin will travel in a peripheral groove portion 31 until it enters a second substantially axially extending portion 32. Up to this point, rotation of the operating handle has not caused any useful valve operating movement. As the pin enters the peripheral groove portion 33, then continued rotation of the handle in a clockwise direction will cause closing movement of the valve from the position of Fig. 3 to the position of Fig. 1. Such movement is caused by engagement of the eccentric crank pin 34 with a slot 21 in the valve stem 20.

To cause open movement of the valve member, the handle is swung from the position of Fig. 1 to the position of Fig. 3. Therefore, during both valve opening and valve closing movements, the pin 28 is in engagement with the peripheral groove portion 33 only. With this arrangement, the operating assembly is maintained in position in the valve operating extension 12 without the use of the usual nut on the upper end of the extension, thereby eliminating one part and facilitating disassembly for cleaning purposes or repair. It is, of course, understood that the pin and slot construction may be reversed if desired so that the groove is on the body extension 12 and the pin on the member 23.

To remove the valve operating assembly it is merely necessary, after swinging the handle in a counterclockwise direction to bring the parts to the valve open position of Fig. 3, to continue rotation in a counterclockwise direction for a short distance until the pin engages the connecting groove portion 32. Then, by pulling upwardly and continuing rotation, the pin will travel in the groove portion 31 until it can be freed from the open end 30 as is clear from Figs. 4 and 5. Thus, while the removal of the operating assembly is simple, it nevertheless will not take place accidentally when not desired.

Figure 6:
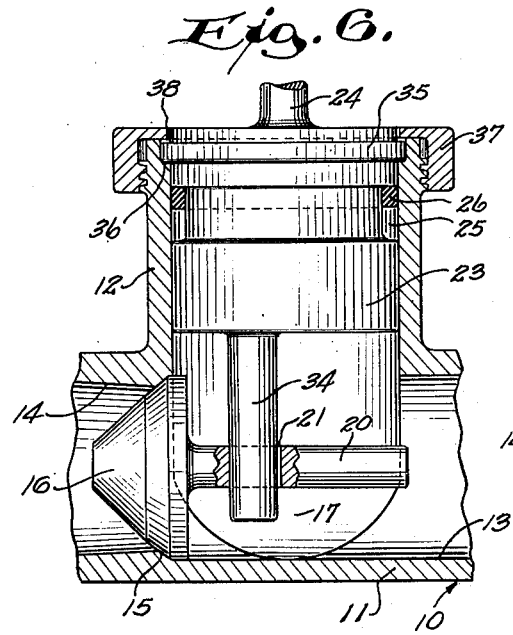
Fig. 6 is a view similar to Fig. 1, illustrating a modified construction, parts being broken away.

In the modified form of the invention of Fig. 6, the construction is the same as in the form of the invention just described, except for the method of retaining the operating assembly in assembled position. In Fig. 6, the same reference numerals are employed to designate all of the parts which are common to the parts of Figs. 1 to 5 inclusive. However, the cylindrical collar 23, in the modification of Fig. 6, has no grooved portions such as the portions 29, 31, 32 and 33, and there is no pin such as the pin 28 on the tubular extension 12. Instead, the upper end of the cylindrical collar 23 has a laterally projecting annular flange 35 which engages an annular seat 36 formed by enlarging the bore of the cylindrical extension 12 at the upper end thereof. The operating assembly is maintained in position by a nut 37 which has a threaded connection with the end of the tubular extension 12. The nut has a central opening 38 through which the uppermost portion of the cylindrical collar 23 rotatably projects, and the annular flange 35 projects beyond the marginal edge of the opening 38.

Figure 7:
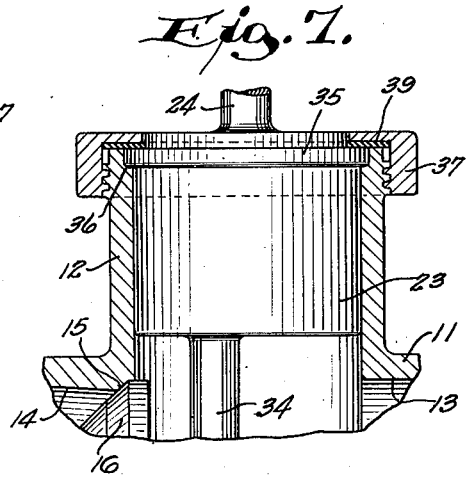
Fig. 7 is a fragmentary longitudinal sectional view showing a modification of the construction of Fig. 6.

In the form of the invention of Fig. 7, all of the parts in common with the styles heretofore described are designated by the same numerals. The modification of Fig. 7, however, eliminates the necessity of employing the sealing gasket 26 and gasket recess 25. This type of gasket is usually formed of rubber, and when the valve is to be used in conduits for certain chemicals which attack rubber the structure of Fig. 7 is desirable. In this form of the invention, a flat gasket 39 of ring-shape surrounds the upper end of the cylindrical collar 23, above the annular flange 35, and seats on the upper end of the body extension 12. The gasket is held in sealing condition by the nut 37. In other respects, the form of the invention of Fig. 7 is the same as the form of Fig. 6.

It is apparent from the above that all forms of the invention are well suited for use in pasteurizing or similar equipment, as they all provide for the free-flow and free-drainage of liquid past the valve member with a minimum of obstruction to the flow. It is also apparent that in the form of the invention of Figs. 1 to 5 inclusive, disassembly has been rendered more simple due to the elimination of the usual nut such as the nut 37 of Figs. 6 and 7.

Various changes and modifications may be made without departing from the spirit of the invention, and all of such changes are contemplated as may come within the scope of the claims.

What I claim is:

1. In a valve, a tubular body portion forming a fluid conduit and having axially alined inlet and outlet portions of different bore diameters to provide a valve seat therebetween, a valve member having a circular portion of substantially the same diameter as the larger bore portion and coaxial therewith and movable axially therein into and out of engagement with said seat, there being portions of said larger bore engaged by the periphery of said circular valve portion throughout the length of movement of said valve, a tubular extension projecting at an angle from said body portion adjacent said seat and between said inlet and outlet portions, said extension having a bore portion of greater diameter than the larger bore portion of the tubular body to produce oppositely disposed bulges at the juncture between said tubular extension and tubular body portion, said bulges being located on each side of the valve member when the latter is in open position, and valve operating mechanism having a portion located in said tubular extension.

2. In a valve, a tubular body portion forming a fluid conduit and having a bore formed with a valve seat, a valve member movable axially of said bore into and out of engagement with said seat, a tubular extension projecting at an angle from said body portion adjacent said seat and having a pin projecting inwardly from its bore, a cylindrical valve operating member rotatable in said tubular extension, said operating member having a peripheral groove engaged by said pin, said groove having an open ended assembly portion and having an offset valve operating portion communicating with said assembly portion whereby said operating member is normally maintained in operative position.

3. In a valve, a tubular body portion forming a fluid conduit and having a bore formed with an annular tapered valve seat, a valve member having a circular portion of substantially the same diameter as said bore and coaxial therewith and having a conical portion, said valve member being movable axially in the bore to bring the conical portion into and out of engagement with the tapered valve seat, there being portions of said bore engaged by the periphery of said circular valve portion throughout the length of movement of said valve, a tubular extension projecting at an angle from said body portion adjacent said seat, said extension having a bore portion of greater diameter than said bore of the tubular body to produce oppositely disposed bulges at the juncture between said tubular extension and tubular body portion, said bulges being located on each side of the valve member when the latter is in open position, and valve operating mechanism having a portion located in said tubular extension.

4. In a valve, a tubular body portion forming a fluid conduit and having a bore formed with a valve seat, a valve member movable axially of said bore into and out of engagement with said seat, a tubular extension projecting at an angle from said body portion adjacent said seat and having a pin projecting inwardly from its bore, a cylindrical valve operating member rotatable in said tubular extension, means projecting from the inner end of said operating member and removably engageable with the valve member for actuating the latter in response to rotation of the operating member, said operating member having a peripheral groove engaged by said pin and said groove having an open ended assembly portion and having an offset valve operating portion communicating with said assembly portion.

5. In a valve, a tubular body portion forming a fluid conduit and having a bore formed with a valve seat, a valve member movable axially of said bore into and out of engagement with said seat, a tubular extension projecting at an angle from said body portion adjacent said seat and having a pin projecting inwardly from its bore, a cylindrical valve operating member rotatable in said tubular extension, means projecting from the inner end of said operating member and removably engageable with the valve member for actuating the latter in response to rotation of the operating member, said operating member having a peripheral groove engaged by said pin and said groove having an open ended entrance portion extending from the inner end of the operating member, having a circumferentially extending portion extending part way around the operating member and having a second circumferentially extending portion which is axially offset from said first circumferentially extending portion.

6. In a valve, a tubular body portion forming a fluid conduit and having a bore formed with a valve seat, a valve member movable axially of said bore into and out of engagement with said seat, a tubular extension projecting at an angle from said body portion adjacent said seat, a cylindrical valve operating member rotatable in said tubular extension, means projecting from the inner end of said operating member and removably engageable with the valve member for actuating the latter in response to rotation of the operating member, and pin and groove means for guiding the operating member into operating position in said tubular extension, said means including an offset groove portion for preventing accidental disengagement.

7. In a valve, a tubular body portion formed with a valve seat, a valve member movable into and out of engagement with said seat, a tubular extension projecting at an angle from said body portion adjacent said seat and having a pin projecting inwardly from its bore, a cylindrical valve operating member rotatable in said tubular extension, and means projecting from the inner end of said operating member and removably engageable with the valve member for actuating the latter in response to the rotation of the operating member, said operating member having a peripheral groove engaged by said pin, and said groove having an open ended assembly portion and having an offset valve operating portion communicating with said assembly portion.

8. In a valve, a tubular body portion forming a fluid conduit and having a bore formed with a valve seat, a valve member movable into and out of engagement with said seat, a tubular extension projecting at an angle from said body portion adjacent said seat, a cylindrical valve operating member rotatable in said tubular extension, means projecting from the inner end of said operating member and removably engageable with the valve member for actuating the latter in response to rotation of the operating member, and pin and groove means for guiding the operating member into operating position in said tubular extension, said means including an offset groove portion for preventing accidental disengagement.

9. In a valve, a tubular body forming a fluid conduit and having a bore formed with a valve seat, a valve member movable into and out of engagement with said seat, a cylindrical valve operating member rotatable in said body, a pin projecting inwardly from the interior of said body adjacent said operating member, and means projecting from the inner end of said operating member and connected to the valve member for actuating the latter in response to rotation of the operating member, said operating member having a peripheral groove engaged by said pin, and said groove having an open ended assembly portion and having an offset valve operating portion communicating with said assembly portion whereby said operating member is normally retained in operative position.

FERDINAND HINRICHS.

REFERENCES CITED

The following references are of record in the file of this patent:

UNITED STATES PATENTS

| Number | Name | Date |
| --- | --- | --- |
| 10,733 | Eakins | Apr. 4, 1854 |
| 900,984 | Coe | Oct. 13, 1908 |
| 1,775,499 | Rosenthal | Sept. 9, 1930 |
| 2,094,222 | Smith | Sept. 28, 1937 |

FOREIGN PATENTS

| Number | Country | Date |
| --- | --- | --- |
| 1,582 | Great Britain | of 1876 |